Sept. 5, 1933.  C. M. GERE  1,925,443

PACKAGING CHEESE

Filed Jan. 27, 1932

Inventor
Clair M. Gere
By Mason Fenwick Lawrence
Attorneys

Patented Sept. 5, 1933

1,925,443

UNITED STATES PATENT OFFICE 1,925,443

PACKAGING CHEESE

Clair M. Gere, Green Bay, Wis., assignor to Natural Cheese Corporation, Dover, Del., a corporation of Delaware Application January 27, 1932. Serial No. 589,298

11 Claims. (Cl. 99—8)

This invention relates to the process for packaging uncured cheese with the intention of letting the cheese ripen or cure in the package. The invention includes the package as well as the process.

Among the advantages of curing cheese in the final package, over ordinary methods of ripening the cheese in a curing room are the avoidance of loss of weight and shrinking in size through drying out, the prevention of rind formation, the elimination of the need for bandaging to prevent cracking and fissures, and the inhibition of mold growth.

Several factors are involved in the packaging of uncured cheese. The package must be of moisture-proof and impervious material, and it must be so sealed as to exclude air, but at the same time, it must provide for the escape of excess carbon dioxide evolved in the course of fermentation.

The shape and condition of the cheese block to be packaged are important factors also. The cheese must be of uniform cross section, whether round or rectangular, and its surface must be free from fissures or other depressions in which any considerable amount of air may be entrapped and which would dilute the carbon dioxide to a point where mold growth would be supported.

The principles of the art of packaging uncured cheese are initially to substantially exclude atmospheric air from contact with the cheese so as to inhibit the starting of mold growth and the enveloping of the cheese with a film of carbon dioxide, autogenously produced to protect it from mold growth, subsequently.

The problem created by the above mentioned factors has been solved satisfactorily by the use of rigid valve-vented containers, such as that described in my application for patent No. 499,601, filed Jan. 2, 1930, but insofar as I am aware no successful attempt has heretofore been made to apply the principles of packaging uncured cheese to the employment of flexible wrappers.

One of the objects of the present invention is to wrap a cheese block in a flexible sheet of suitable material such as impervious paper or membranes of cellulose viscose, cellulose acetate or other suitable substance, cementing the edges of the folded wrapper together except at suitable points where vents are left between the overlapping portions, then subjecting the package to pressure so as to intimately contact the wrapper with the surface of the cheese and to expel the displaced air through said vents, then to seal said vents in such a manner as to exclude air but to permit them subsequently to open from excess pressure within the package, produced by the fermentative evolution of carbon dioxide gas.

Another object of the invention is the package produced by the above process.

Other objects of the invention will appear as the following description of a preferred and practical embodiment thereof proceeds.

In the drawing which accompanies and forms a part of the following specification, and throughout the several figures of which the same characters of reference have been employed to designate identical parts:

Figure 1:
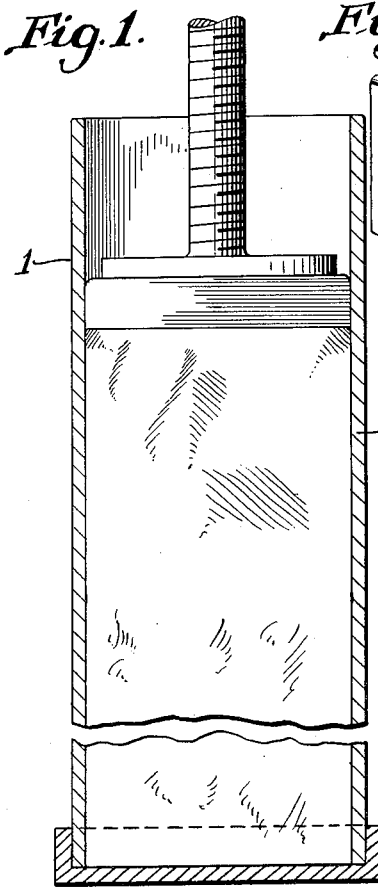
Figure 1 is a longitudinal section through a cheese mold illustrating the initial formation of an elongated mass or bar of cheese from which blocks or units to be packaged, of uniform cross section and exact proportionate weight may be cut.
Figure 2:
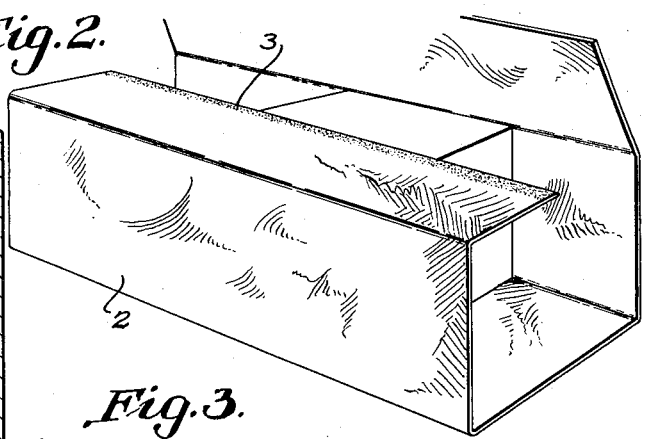
Figure 2 illustrates the step of placing the wrapper about the block, cementing of the lapping edges of the wrapper being indicated.
Figure 3:
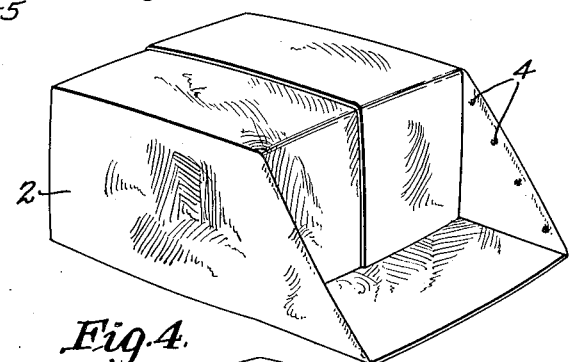
Figure 3 is a perspective view showing cement spotted at intervals along the edges of their folds.
Figure 4:
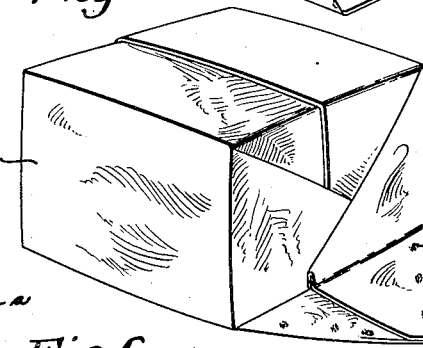
Figure 4 is a perspective view showing the wrapper partially folded.
Figure 5:
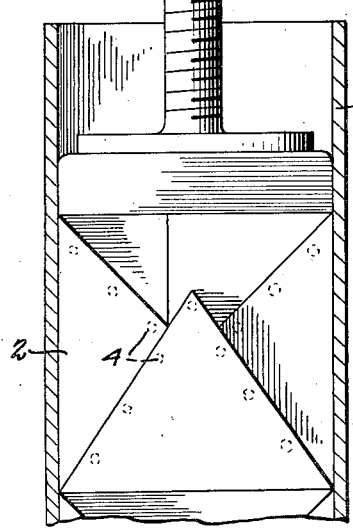
Figure 6:
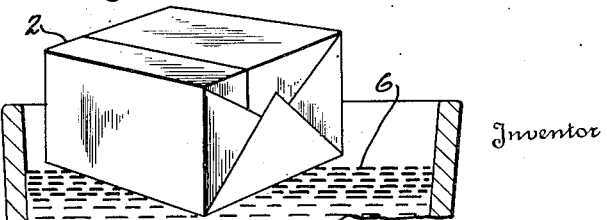

Figure 5 is a longitudinal section through a mold slightly larger than the mold shown in Figure 1 in which the packaged block is placed and compressed in order to bring the wrapper into intimate contact with the block for the purpose of expelling air; and Figure 6 shows a perspective view of the package as it comes from the mold shown in Figure 5, in the act of being immersed in a coating or impregnating solution of molten paraffine at a temperature not substantially cooler than 220° F.

Before adverting to a description of the process of the present invention, and in order more clearly to distinguish the new from the old, the usual method of manufacturing cheese will be briefly described. According to known commercial methods, the cheese is pressed in various shapes and weights, being encased in bandages or cloth to prevent the formation of fissures caused by the cheese cracking when exposed to the air, and to protect the surface of the cheese. The bandage also assists in the formation of a rind thus making the foundation upon which a coating of paraffine will adhere, the paraffine being applied after the rind has been formed and the surface of the cheese sufficiently dried. The usual method for curing the cheese is to set the molded cheese on shelves in the curing room to permit it to ripen. This method is uneconomic for the reasons that cheese is a good culture for mold growth in the presence of the oxygen in the air so that in the course of curing, the cheese may become invested on its outer surfaces and in such fissures as may occur with mold growth which under certain conditions optimum for mold culture may extend throughout the texture of the cheese.

Another disadvantage of curing cheese in the presence of air is shrinkage due to evaporation of moisture and the formation of rind incident to such evaporation, which rind must be subsequently removed by the processes of handling the cheese and by the consumer, the rind representing a total loss. Such rind loss may represent 3% of the gross weight of the cheese. By the usual methods of curing however, rind formation is necessary in order that the coat of paraffine may be applied. It is not possible to apply paraffine directly to a green cheese or a cheese direct from the press or before such rind has formed. Paraffine will not adhere to wet surfaces such as green or uncured cheese. The object of coating the cheese with paraffine is to arrest the evaporation of moisture, although the film of paraffine does not completely stop evaporation but reduces it. The total loss from evaporation on paraffined cheese from the time it is removed from the press until cured, amounts to approximately 6%. On unparaffined cheese such evaporation losses amounts to about 8½%.

During the curing period of cheese carbon dioxide is autogenously produced within the cheese and permeates slowly through the rind and the paraffined surfaces and acts as a sterilizing agent against mold growth within the cheese on the rind, or between the rind and the coating of paraffine, provided the proper rind has been formed and is sufficiently dry to form a surface to which the paraffine may adhere. If the paraffine coating be broken, cracked or chipped, thus exposing the rind, mold will immediately form on the bared surfaces, damaging the appearance of the cheese.

It is quite impossible to maintain the paraffined surfaces of the rind without some cracking or breaking and consequently, it is practically impossible to produce cheese by ordinary methods without the presence of some mold growth.

In the operation of my new process for packaging cheese, the cheese curd is first pressed into a mold 1 of uniform cross section, and sufficiently long to contain a pressed mass of sufficient length to be cut into a plurality of the units to be packaged. On account of the uniformity in the cross section of the mass and the fact that it has all been subjected to the same pressure, cut portions of the same length will have exactly the same weight. Thus the ordinary methods of cut and try which characterize the packaging of cured cheese or cheese cut from a bulk of irregular cross section and which result in considerable wastage are not employed in my process. After the bars of cheese are cut into blocks of exact weight, the cheese is wrapped in a water-proof, impervious and grease-proof wrapper 2.

This wrapping material is preferably but not necessarily transparent, such as cellulose viscose or cellulose acetate. Both of these substances transmit ultra-violet rays and thus assist in maintaining the surfaces of the cheese sterile. The wrapping material should be flexible and tough so as to withstand second pressing of the wrapped cheese, as will be referred to later. Such wrapping may be plain or printed and used either by itself or laminated to cheese cloth of standard or special weave or to tinfoil, parchment paper or other materials. It is understood that the wrapper material may be cut into sheets of sizes to fit the cheese block, for either hand or machine application and that it may be if desired, furnished in rolls.

In carrying out the process of the invention, the cheese block is set on a sheet of the wrapping material which is brought up about two sides and the top of the block and then lapped in known manner. The lapping edges of the wrapper are cemented together in any suitable manner either by an adhesive carried by or applied to one of the lapped edges as indicated at 3, or by fusing with heat or by the use of solvents or in any other manner. The ends of the wrapper are then folded against the ends of the cheese block in known manner so as to form a smooth package conforming approximately to the surfaces of the cheese. The edges of such folds are spotted as at 4 with a suitable adhesive or by the use of heat or solvents applied intermittently along the edges of the folded portions so as to cause them to adhere at intervals to adjacent surfaces of the wrapper. This provides flat openings between the united spots through which air may be expelled. The object of cementing or adhering the folded ends of the wrapper together is to hold them in place while the subsequent steps of the process are being performed and particularly so when the package is paraffined. The folds will be held so tightly together as to prevent an excessive amount of paraffine finding its way between these folds and which upon cooling or handling would crack and permit oxygen to find its way into the package, diluting the carbon dioxide and resulting in a condition conducive to the development of mold growth between the wrapper and the outer surfaces of the cheese.

After the cheese has been wrapped and the ends cemented as outlined above, the packages are placed in a mold 5a slightly larger than the mold which was used in the initial formation of the blocks, and sufficient pressure is applied to the packages to bring the folds tightly together and to force the wrapper in close contact with the cheese thus expelling the maximum amount of air from between the surfaces of the wrapper and the cheese, the air finding its way out through the flat openings formed between the spot-welded edges of the end folds. The reduction of the air content to a minimum is important. If large amounts of air are left in the package a longer period is required for the saturation of such air with carbon dioxide and mold growth will start before sufficient carbon dioxide has been evolved to suppress it. This second pressing in a slightly larger mold also gives a neater appearance to the cheese, since it forces the wrapper tightly against the surfaces of the cheese.

After the cheese has been subjected to this second pressure for a period of approximately from eight to twelve hours, it has become permanently shaped to the mold. If the pressure is not applied long enough, the cheese will not retain the desired shape, but will expand somewhat, due to its rubbery constituency at this stage, to an extent impairing the appearance of the package and perhaps cracking the wrapper.

After this final pressing, the folds of the wrapping material will be laid tightly against the surfaces of the cheese. The package is then submerged into a body 6 of molten paraffine at a temperature of approximately 220° F. The paraffine may be pure or combined with other fusible coating substances such as bees wax or resin. By submerging the cheese package into the above coating material, a thin coating of such material is laid on to the entire surfaces of the package thus sealing the same against the entrance of air since a very thin film of paraffine has penetrated the flat openings between the united spots and has sealed them. This film is however so delicate as to be readily ruptured by excess pressure from within the package.

The fluidity of the wax materials above referred to is quite important as, if they are not sufficiently heated a heavier layer will be deposited which will break or crack either upon the cooling of the coating or later in handling. It is most important that the film of wax closing the intervals between the united spots be so slight that it will not crack and by doing so open a channel for the escape of all of the carbon dioxide pressure and the diffusion of atmospheric air within the package.

The conditions for curing, after the cheese block has been wrapped and treated in the manner above related are the same as exist with a cheese upon which a rind has been formed and a coating of paraffine applied in usual manner. I have however, through the use of a moisture-proof, grease-proof, impervious and preferably transparent material and the applying of my novel process thereto, eliminated the formation of rind and put the cheese in a convenient form for the consumer, in that it can be packaged in units of any size. Through this saving of rind waste and shrinkage, a great saving is effected, amounting to approximately 10%.

The transparency of the wrapper is a distinct advantage in that any one can see the cheese is free from mold and other defects thus stimulating the confidence of the purchaser.

This method of packaging may be applied to packaging cured cheese after the cheese is cured in the usual way, uncured cheese, process cheese or other cheese of the cheddar genus. It may be cut into desired weights and shaped and treated as outlined above thus arresting shrinkage and preventing mold growth and making an economical and convenient package for the consumer.

What I claim is:

1. Process for packaging cheese comprising enfolding a block of cheese in a flexible wrapper, bonding lapping portions of the wrapper at intervals, pressing the wrapped block in a mold to bring the wrapping into intimate surface contact with all sides of the block, thereby expelling the displaced air through the rifts formed between the margins of the lapped portions between the points of bonding, and submerging the packaged block thus pressed, into molten paraffine for airtighing the package and thinly sealing the rifts.

2. Process for packaging cheese as claimed in claim 1, the molten paraffine being at a temperature of approximately 220° F.

3. Process for packaging cheese comprising enfolding a block of cheese in a flexible wrapper, bringing the opposite edges of said wrapper together in lapped relation, causing them to adhere in an air tight manner, folding the ends of the wrapper against the ends of the block, bonding the margins of the folded portions of the wrapper to the portions against which they fold at intervals, pressing the block so wrapped in a mold to bring the wrapper into intimate surface contact with all sides of the block, thereby expelling the displaced air through the rifts formed between margins of the lapped portions between the points of bonding, and submerging the packaged block thus pressed into molten paraffine for airtighing the package and thinly sealing said rifts.

4. Process for packaging cheese comprising molding a bar of cheese of uniform cross section, cutting the molded bar of cheese into blocks, enfolding a block in a flexible wrapper, bonding lapping portions of the wrapper at intervals, subjecting the wrapped block to pressure in a mold slightly larger than the mold used in the first mentioned molding to bring the wrapper into intimate surface contact with all sides of the block, thereby expelling the displaced air through the rifts formed between margins of the lapped portions of the wrapper between the points of bonding, and submerging the packaged block thus pressed into molten paraffine for air-tighting the package and thinly sealing said rifts.

5. Package comprising in combination a block of cheese, and a wrapper comprising a flexible moisture-proof impervious membrane enfolding said block with portions in lapped relation, said membrane being in pressed surface contact with all sides of said block, certain of said lapping portions being bonded together at intervals forming rifts between the points of bonding, and a thin film of paraffine or the like sealing said rifts.

6. Package comprising in combination a block of cheese, and a wrapper comprising a flexible moisture-proof impervious membrane enfolding said block with portions in lapped relation, the said membrane being in pressed surface contact with all sides of said block of cheese, certain of said overlapping portions being bonded together at intervals forming rifts between the points of bonding, and a thin film of paraffine or the like coating said wrapper and thinly sealing said rifts.

7. Package as claimed in claim 5, the wrapper having the property of transmitting ultra-violet light rays.

8. Package as claimed in claim 5, the wrapper being transparent.

9. Package comprising in combination a block of cheese, and a wrapper comprising a flexible moisture-proof impervious membrane enfolding said block and having its opposite edges overlapped in an air tight seam, the ends of said membrane being disposed in folded relation against the ends of said block, said membrane being in pressed surface contact with all sides of said block, the margins of the folded portions of said membrane being bonded together at intervals against that portion of said membrane against which they are folded forming rifts between the points of bonding, and a thin film of paraffine sealing said rifts.

10. Package comprising in combination a block of cheese and a wrapper comprising a flexible moisture-proof impervious membrane enfolding said block and having the opposite edges overlapped in an air tight seam, the ends of said wrapper being disposed in folded relation against the ends of said block, the margins of the folded portions of the ends of said membrane being bonded at intervals with that portion of the membrane against which they fold, defining rifts between the points of bonding, said membrane being in pressed surface contact with all sides of said block of cheese, and a thin film of paraffine or the like coating said wrapper and thinly sealing said rifts.

11. Process for packaging cheese comprising wrapping a block of cheese in a flexible wrapper, cementing together, at intervals, overlying marginal portions and underlying portions of the wrapper, forming rifts, pressing the wrapper into intimate contact with the surfaces of the cheese so as to displace any air film from between said cheese and wrapper, and coating the wrapper including the rifts, with a thin film of paraffine or the like.

CLAIR M. GERE.